US012386917B2

(12) United States Patent
Chakrabartty

(10) Patent No.: US 12,386,917 B2
(45) Date of Patent: Aug. 12, 2025

(54) MULTI-MODAL SENSING BLOCKCHAINS USING FOWLER-NORDHEIM SENSOR DATA LOGGER

(71) Applicant: Washington University, St. Louis, MO (US)

(72) Inventor: Shantanu Chakrabartty, St. Louis, MO (US)

(73) Assignee: Washington University, St. Louis, MO (US)

( * ) Notice: Subject to any disclaimer, the term of this patent is extended or adjusted under 35 U.S.C. 154(b) by 431 days.

(21) Appl. No.: 17/819,484

(22) Filed: Aug. 12, 2022

(65) Prior Publication Data

US 2023/0046551 A1 Feb. 16, 2023

Related U.S. Application Data

(60) Provisional application No. 63/260,283, filed on Aug. 16, 2021.

(51) Int. Cl.
*G06F 17/40* (2006.01)
*H04L 9/00* (2022.01)
*H04W 4/38* (2018.01)

(52) U.S. Cl.
CPC ............... *G06F 17/40* (2013.01); *H04L 9/50* (2022.05); *H04W 4/38* (2018.02)

(58) Field of Classification Search
None
See application file for complete search history.

(56) References Cited

U.S. PATENT DOCUMENTS

| | | |
|---|---|---|
| 5,504,706 A | 4/1996 | D'Arrigo et al. |
| 7,757,565 B2 | 7/2010 | Chakrabartty |
| 8,056,420 B2 | 11/2011 | Chakrabartty et al. |
| 8,177,423 B1 | 5/2012 | Fair et al. |
| 8,344,475 B2 | 1/2013 | Shaeffer et al. |
| 8,902,627 B1 | 12/2014 | Pesavento et al. |
| 8,963,647 B2 | 2/2015 | Chakrabartty |
| 11,041,764 B2 | 6/2021 | Chakrabartty et al. |

(Continued)

FOREIGN PATENT DOCUMENTS

EP 2860767 A1 4/2015

OTHER PUBLICATIONS

Zhou, et al., "Scavenging Thermal-noise Energy for Implementing Long-term Self-powered CMOS Timers," IEEE vol. 879-1-4673-5762, Mar. 13, 2013.

*Primary Examiner* — Raymond L Nimox
(74) *Attorney, Agent, or Firm* — Armstrong Teasdale LLP

(57) ABSTRACT

A sensor blockchain system is provided. The sensor blockchain system includes a plurality of sensor-data-loggers, wherein each sensor-data-logger includes a memory device which utilizes FN tunneling. An input to the sensing interface alters the geometry of the energy barrier to change the electron leakage rate and the current state of the sensor-data logger is determined by an initial state of the sensor-data-logger, the predetermined electron leakage rate, and any inputs to the sensing interface. The sensor-data-loggers may be synchronized to an initial state. The synchronization will be maintained when they are all subjected to similar changes in environmental conditions in a supply chain. Desynchronization will occur due to changes in environment, including changes in temperature.

20 Claims, 5 Drawing Sheets

(56) References Cited

U.S. PATENT DOCUMENTS

| | | |
|---|---|---|
| 2001/0014033 A1 | 8/2001 | Miyamoto et al. |
| 2006/0256617 A1 | 11/2006 | Yano et al. |
| 2010/0096556 A1 | 4/2010 | Arsalan et al. |
| 2014/0367631 A1 | 12/2014 | Govoreanu |
| 2015/0162369 A1 | 6/2015 | Roizin et al. |
| 2016/0293268 A1 | 10/2016 | Jan et al. |
| 2018/0114577 A1* | 4/2018 | Chakrabartty .......... G04F 10/10 |

\* cited by examiner

MULTI-MODAL SENSING BLOCKCHAINS USING FOWLER-NORDHEIM SENSOR DATA LOGGER

PRIORITY

This application claims the benefit of U.S. Provisional 63/260,283 filed Aug. 16, 2021, which is hereby incorporated by reference as if submitted in its entirety.

STATEMENT REGARDING FEDERALLY SPONSORED RESEARCH & DEVELOPMENT

This invention was made with government support under ECCS1550096 awarded by the National Science Foundation. The government has certain rights in this invention.

FIELD

The field of the present disclosure relates generally sensor blockchain systems, and more particularly, to sensor blockchain systems which utilize Fowler-Nordheim (FN) tunneling to detect environmental conditions.

BACKGROUND

Implementation of reliable and secure monitoring of environmental conditions remains an unsolved challenge in supply-chain monitoring. One of the challenges in supply-chain monitoring is to verify whether products were stored or were transported under the right set of conditions. For example, in a pharmaceutical cold-chain, it is important that a specific range of temperature be always maintained during storage and shipping for a vaccine to retain its efficacy. Also, it is important to ensure that the data stored on the sensor cannot be tampered with or manipulated.

SUMMARY

In one aspect, a sensor blockchain system is provided. The sensor blockchain system includes a plurality of sensor-data-loggers, wherein each sensor-data-logger includes a memory device which utilizes FN tunneling. An input to the sensing interface alters the geometry of the energy barrier to change the electron leakage rate and the current state of the sensor-data logger is determined by an initial state of the sensor-data-logger, the predetermined electron leakage rate, and any inputs to the sensing interface.

In another aspect, a method of recording environmental changes in a supply chain using a plurality of sensor-data-loggers. Each sensor-data-logger comprises a memory device comprising a floating-gate with a sensing interface, the sensing interface having an energy barrier configured to leak electrons at a predetermined electron leakage rate through Fowler-Nordheim (F-N) tunneling. An input to the sensing interface will alter a geometry of the energy barrier to change the electron leakage rate, and a current state of the sensor-data logger is determined by an initial state of the sensor-data-logger, the predetermined electron leakage rate, and any inputs to the sensing interface.

In yet another aspect, a supply chain monitoring system is provided. The supply chain monitoring system includes a plurality of sensor-data-loggers, wherein each sensor-data-logger includes a memory device which utilizes FN tunneling. An input to the sensing interface alters the geometry of the energy barrier to change the electron leakage rate and the current state of the sensor-data logger is determined by an initial state of the sensor-data-logger, the predetermined electron leakage rate, and any inputs to the sensing interface.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
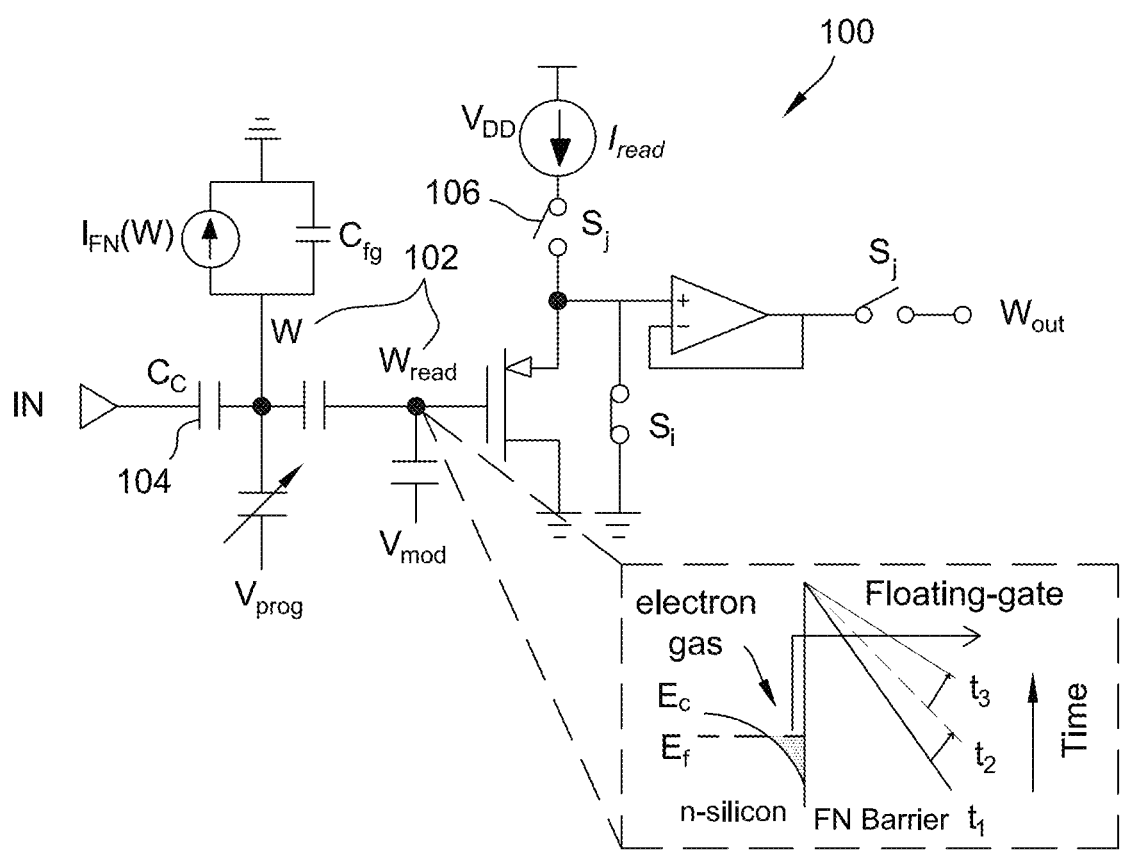
FIG. 1 is an exemplary circuit diagram 100 of a single node in accordance with at least one embodiment.

Unless otherwise indicated, the drawings provided herein are meant to illustrate features of embodiments of the disclosure. These features are believed to be applicable in a wide variety of systems including one or more embodiments of the disclosure. As such, the drawings are not meant to include all conventional features known by those of ordinary skill in the art to be required for the practice of the embodiments disclosed herein.

DETAILED DESCRIPTION

The systems and methods described herein are generally related to sensor blockchain systems and, more particularly, to sensor blockchain systems which utilize Fowler-Nordheim (FN) tunneling to detect and record environmental conditions.

The systems described herein include one or more self-powered sensors for monitoring events. As used herein, an "event" refers to a measurement value collected by the sensors that exceeds a predetermined threshold. For example, if the sensor is monitoring vibrations, an event may be a vibration that exceeds a typical vibration. The sensors include a memory device with a floating-gate transistor that continuously leaks electrons at a predefined rate. The changing voltage in the floating-gate resulting electron leakage is used as a clock to allow a timestamp to be determined for events detected by the sensor. To detect events, the sensors include a transducer that generates a sensor signal in response to an event. The sensor signal modulates the memory device to change the rate of electron leakage. More particularly, the sensor signal modulates a geometry (size and/or shape) of an energy barrier of the floating-gate to change the rate of electron leakage. When the stored data is analyzed, an unexpected change in the rate of electron leakage typically indicates an event occurred and was detected by the sensor. The measurement value (i.e., magnitude) and the timestamp of the event may be identified or reconstructed for analysis based on the sensor data retrieved from the memory device.

The sensor blockchain system is comprised of a plurality of FN sensor-data-loggers which are configured to detect and record environmental conditions. Each of these FN sensor-data-loggers is composed of two nodes, each node containing two floating gates connected by a capacitor. By applying a charge to either of the floating gates, the energy barrier is changed, allowing for FN tunneling. As the electrons tunnel through the triangular barrier, the barrier profile changes and inhibits tunneling of electrons.

The sensor-data-loggers may be synchronized to an initial state. The synchronization will be maintained when they are all subjected to similar changes in environmental conditions in a supply chain. Desynchronization will occur due to changes in environment, including changes in temperature.

The sensor-data-loggers may be interfaced with different sensor transducers to measure different environmental conditions including, but not limited to, ambient temperature, ambient mechanical vibration, or ambient radio frequency, for example. If the sensor-data-loggers are exposed to similar environmental conditions, the sensor-data-loggers will remain in sync. If the sensor-data-loggers go through different environmental trajectories, the sensor-data-loggers will become desynchronized. This desynchronization will serve as a dynamic signature to authenticate the product in the supply chain.

In another aspect, the sensor-data-loggers are self-powered therefore providing a method for monitoring environmental conditions and improving the utility of such sensors in supply chain applications.

FIG. 1 depicts a circuit diagram of a single node system 100 for monitoring environmental conditions. In the example embodiment, the node includes, for example, two floating gates 102, a tunneling gate and a readout gate. The floating gates are decoupled via a capacitor 104. In other embodiments, system 100 may include additional, fewer, or alternative components, including those described elsewhere herein. For example, the system 100 may include a plurality of nodes each having a plurality of floating gates 102. In at least one embodiment, a charge is applied to each floating gate 102 individually using a combination of tunneling (to increase charge, coarse tuning) and hot electron injection (to decrease charge, fine tuning). When the charge is applied to the floating gate, the shape of the barrier is modified which facilitates FN tunneling through the modified energy barrier. In some embodiments, a sensor coupled to the floating gate may vary the shape of the barrier in response to its detections, which variations will result in a record of the conditions experienced by the node. The sensor may be, for example, a temperature sensor, a vibration sensor, an RF sensor, or any other sensor suitable for detecting environmental conditions. Additionally, or alternatively, temperature variations experienced by the floating gate may also affect the shape of the barrier even absent any sensor. Thus, in some embodiments, the ambient temperature around the node may be detected without a separate temperature sensor. As the electron tunnels through the triangular barrier the barrier profile changes which further inhibits the tunneling of electrons. Additional details may be found in U.S. Pat. No. 11,041,764, which is incorporated herein by reference in its entirety.

The tunneling gate stores the dynamic analog memory, and a sufficient potential is applied to initiate observable FN tunneling. The readout gate is capacitively decoupled from the tunneling gate to avert readout disturbances. The readout node is biased at a lower voltage to prevent injection into the readout node during operation. The potential of the readout node is lowered through hot electron injection. Switch 106 allows for individual control of each FN-DAM block for reading and programming.

V(t) is the floating gate voltage given by:

$$V(t) = \frac{k_2}{\log(k_1 t + k_0)}$$

Where $k_1$ and $k_2$ are device specific parameters and $k_0$ depends on initial condition as:

$$k_0 = \exp\left(-\frac{k_2}{V_0}\right)$$

Using the dynamic given, the Fowler-Nordheim tunneling current can be calculated as:

$$\frac{I_{FN}(V(t))}{C_r} = \frac{d(V(t))}{dt} = \left(\frac{k_1}{k_2}\right)V^2\exp\left(-\frac{k_2}{V}\right)$$

Figure 2:
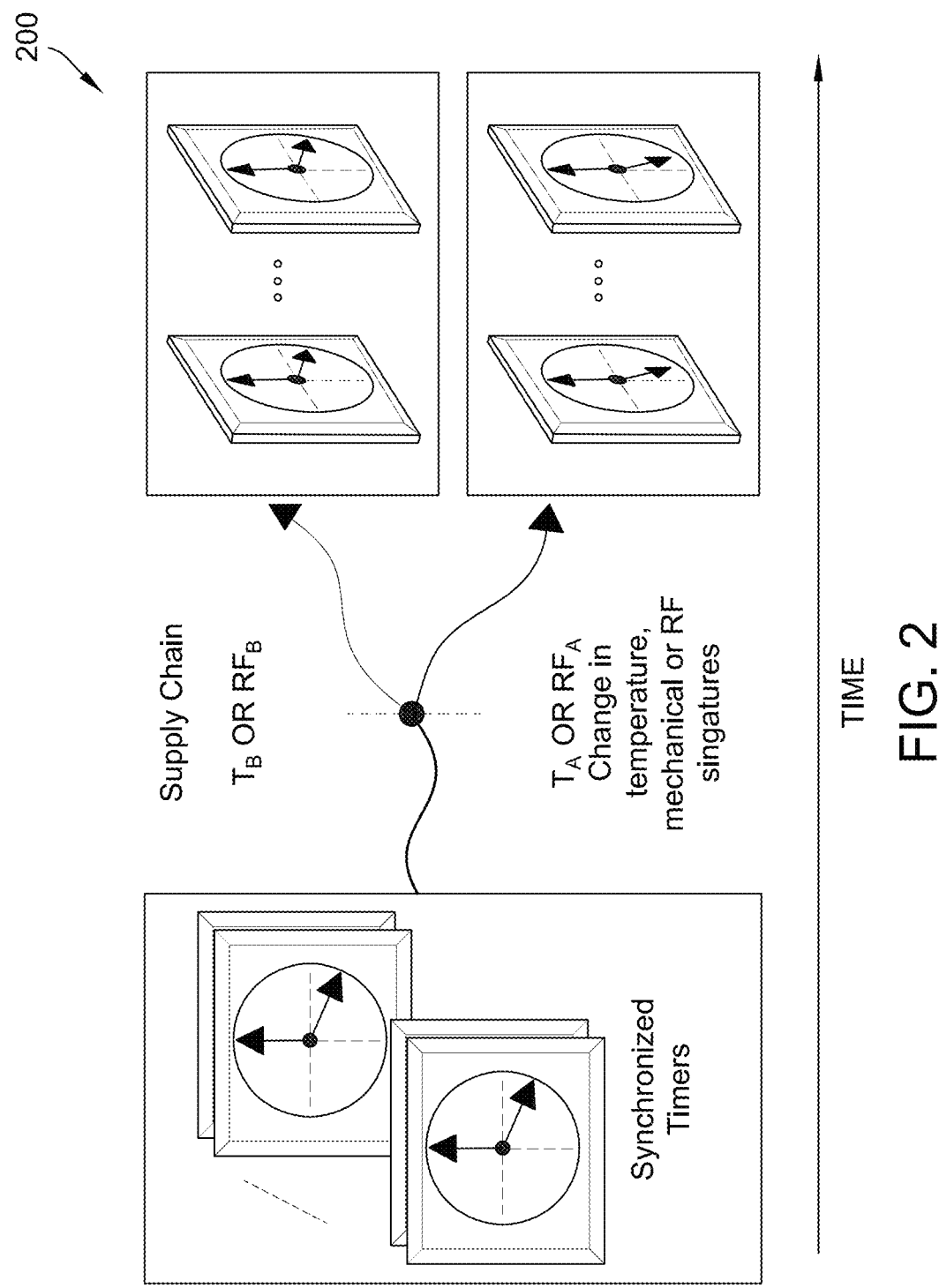
FIG. 2 is a graphical representation 200 of synchronized sensor-data-loggers in accordance with at least one embodiment.

FIG. 2 depicts a diagram 200 illustrating a concept wherein an array of FN-timers is interfaced with different sensor transducers. In an example embodiment, multi-modal sensing is provided where environmental signatures are used to modulate the trajectory of the network of FN-timers. In some embodiments, the FN-timers may all be synchronized to an identical initial state. The synchronization may be maintained providing that all the FN-timers are subjected to similar environmental conditions. Changes in environmental conditions may include changes in ambient temperature, ambient vibrations, or ambient radio-frequency signals. If, at any time, the FN-timers are subjected to differing environmental conditions, the FN-timers will desynchronize with respect to each other. This desynchronization serves as a dynamic signature to indicate a difference in environmental conditions. Moreover, in some embodiments, the FN-timers may be compared to predicted or simulated FN-timers based on expected or ideal conditions. Thus, even if all real timers experience the same conditions and remain synchronized, deviations from ideal conditions may be identified.

The signature may also be used to identified tampered devices or devices that were maliciously inserted into the supply chain. In this regard, the FN-timer ensemble acts as a sensor blockchain. The state of the array serves as a function of the history of the sensing environment.

Figure 3:
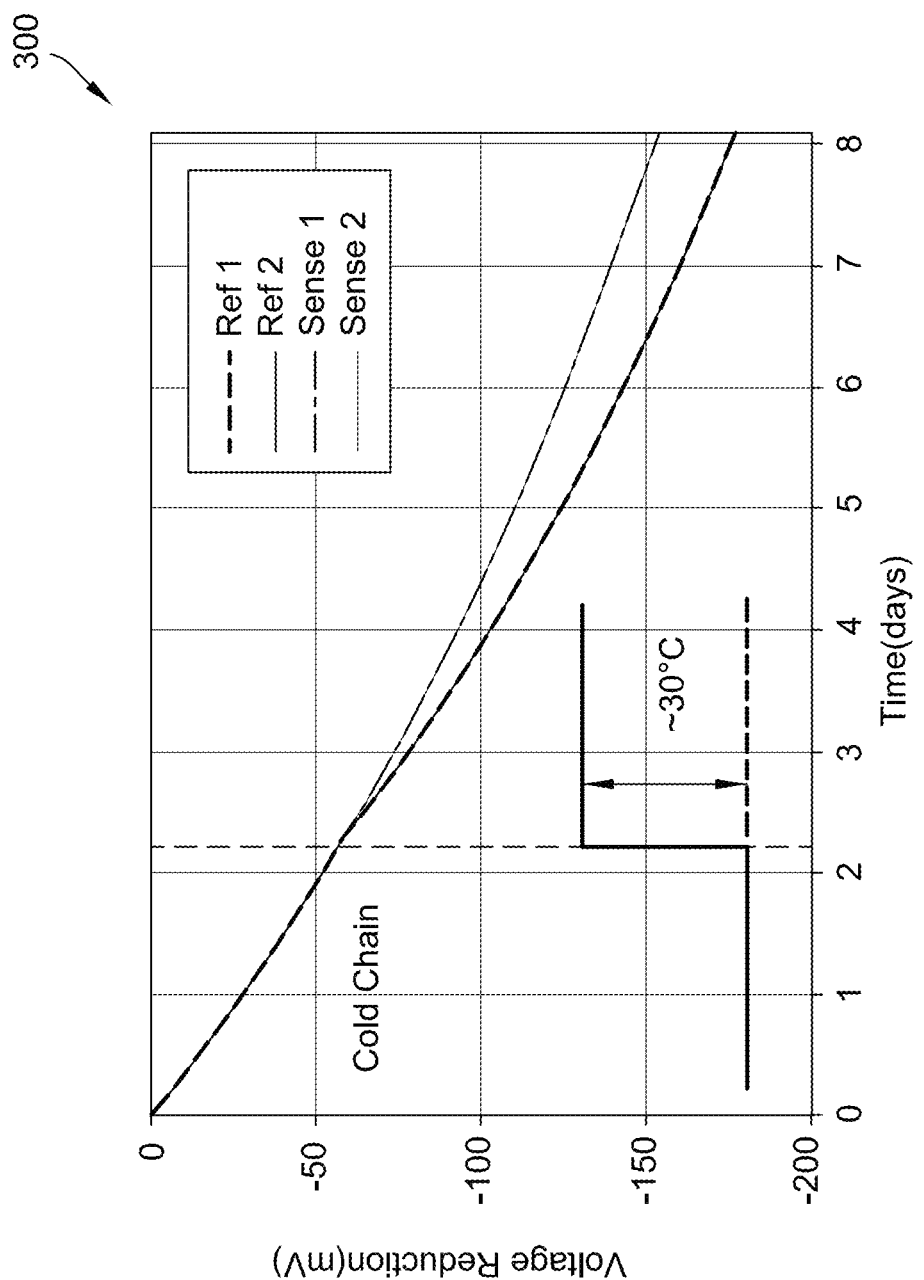
FIG. 3 is graph 300 of the results using Fowler-Nordheim (FN) sensor-data-loggers subjected to different temperature profiles in accordance with at least one embodiment.

FIG. 3 depicts a graph 300 showing the results of FN timers subjected to different temperature profiles. A voltage reduction is seen as a result of the change in temperature that each sensor-data-logger experience. In the example embodiment, while the sensor-data-loggers were originally synchronized at an identical initial state, the sensor-data-loggers desynchronize when exposed to different ambient temperatures.

In one example, four sensor-data-loggers may be split into two pairs, with one pair operating in an environmental chamber where temperature can be accurately controlled, and the other pair operating in a standard room environment. As shown in FIG. 3, as the pairs are subjected to the same temperature variations, the sensor-data-loggers remain in sync, however, the pairs will desynchronize with respect to each other when they are subjected to different temperature conditions. Alternatively, single sensor-data-loggers may be used in certain applications.

Figure 4:
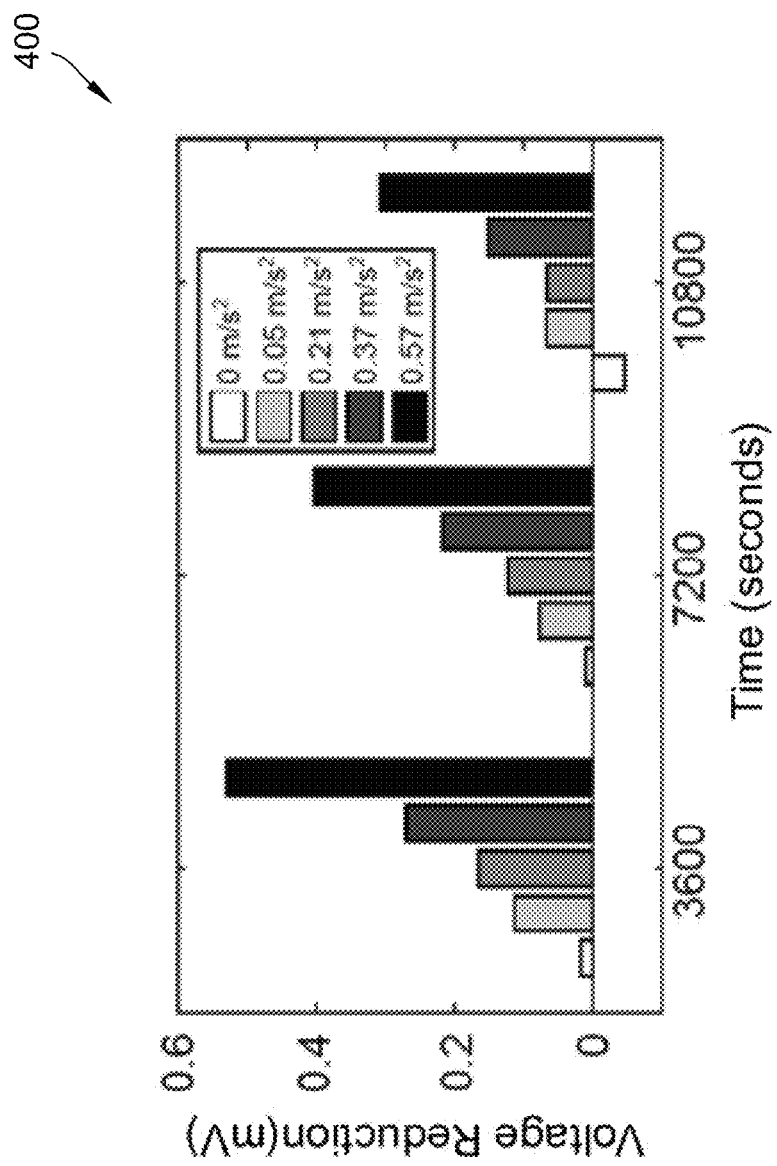
FIG. 4 is a graph 400 of results showing the differential FN sensor-data-logger interfaced with a piezoelectric accelerometer in accordance with at least one embodiment.

FIG. 4 depicts a plot 400 of measured results of FN sensor-data-logger interfaced with a piezoelectric accelerometer capable of sensing ambient mechanical vibrations.

Figure 5:
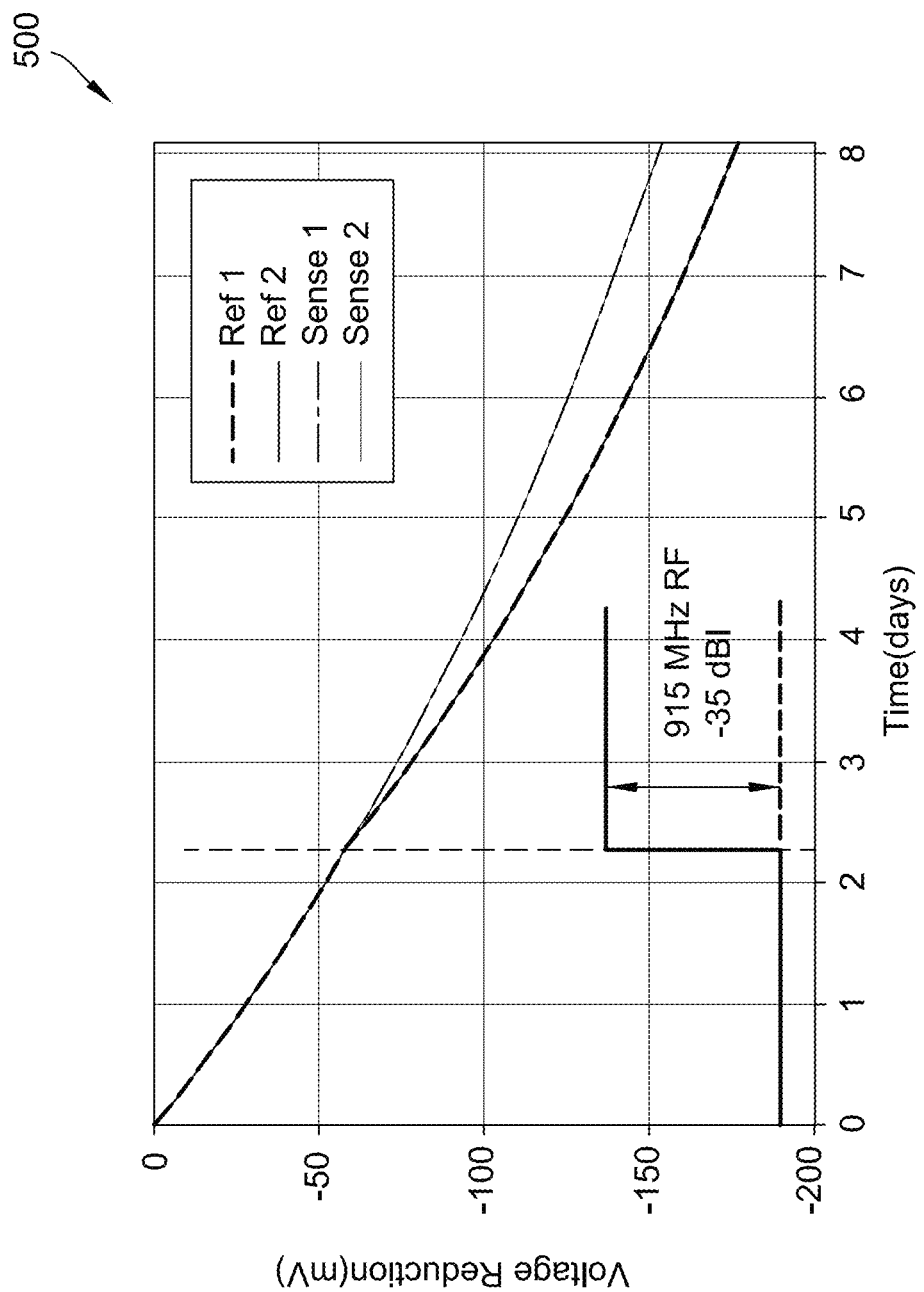
FIG. 5 is a graph 500 showing measured results of an FN sensor-data-logger when interfaced with a rectenna capable of sensing changes in an ambient RF environment in accordance with at least one embodiment.

FIG. 5 depicts a graph 500 illustrating the results of FN timers subjected to different radio frequency profiles in accordance with at least one example embodiment. A voltage reduction is seen as a result of the change in radio frequency that each sensor-data-logger experiences. While the sensor-data-loggers were originally synchronized at an identical initial state, the sensor-data-loggers desynchronize when exposed to different ambient radio frequencies.

Each sensor-data-logger may use FN tunneling to change the barrier profile and allow electrons to tunnel through the barrier. In this example, as the electrons tunnel through the triangular barrier, the barrier profile changes and inhibits tunneling of electrons. A change in ambient temperature may change the barrier profile or alternatively, the sensor-data-loggers may be coupled with different transducers to sense changes in temperature, vibrations, or radio frequency. All three modalities may be combined such that the FN sensor-data-logger can produce a compound authentication signature. In this scenario all the trajectories could be coupled to each other and the resulting ensemble output will be unique to the product supply-chain. Verifying the blockchain would involve estimating the distances between the final ensemble vectors generated by the FN sensor-data-logger across different data-logger chipsets that were transported under similar conditions.

The methods discussed herein may include additional, less, or alternate actions, including those discussed elsewhere herein. The methods may be implemented via one or more local or remote devices. Additionally, the systems and devices discussed herein may include additional, less, or alternate functionality, including that discussed elsewhere herein.

The above systems and methods enable long-term, self-powered monitoring for rare or sparse events for multiple applications. For example, the above systems and methods may be used in medical, mechanical, chemical, and/or other applications. The sensors may also be configured to monitor time to facilitate time stamping, such as for cold chain supply management. The sensors described above include non-volatile memory to enable periodical retrieval of sensor data instead of constantly monitoring the sensor. In addition, the systems and methods are configured to provide both a timestamp and measurement value for each event to facilitate reconstruction of the event as a function of time for additional analysis.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A sensor blockchain system for detecting environmental conditions, the sensor blockchain system comprising:
a plurality of sensor-data-loggers, each sensor-data-logger comprising:
a memory device comprising a floating-gate with a sensing interface, the sensing interface having an energy barrier configured to leak electrons at a predetermined electron leakage rate through Fowler-Nordheim (F-N) tunneling, wherein an input to the sensing interface will alter a geometry of the energy barrier to change the electron leakage rate, and a current state of the sensor-data logger is determined by an initial state of the sensor-data-logger, the predetermined electron leakage rate, and any inputs to the sensing interface, and wherein a desynchronization of the plurality of sensor-data-loggers occurs when the plurality of sensor-data-loggers are subject to different environmental conditions, and the desynchronization is usable as a signature for performing at least one of authentication or identification.

2. The sensor blockchain system of claim 1, wherein the plurality of sensor-data-loggers are synchronized with each sensor-data-logger having a same initial state.

3. The sensor blockchain system of claim 1, wherein the sensing interface of each sensor-data-logger is configured to receive an ambient temperature as the input to the sensing interface.

4. The sensor blockchain system of claim 1, wherein at least one sensor-data-logger of the plurality of sensor-data-loggers further comprises a sensor with its output coupled to the sensing interface.

5. The sensor blockchain system of claim 4, wherein the sensor comprises a temperature sensor, a vibration sensor, or a radio frequency signal sensor.

6. The sensor blockchain system of claim 4, wherein at least one of the sensor-data-loggers comprises a sensor different than at least one other sensor-data-logger of the plurality of sensor-data-loggers.

7. The sensor blockchain system of claim 1, wherein each sensor-data-logger of the plurality of sensor-data-loggers further comprises a sensor with its output coupled to the sensing interface.

8. A method of recording environmental changes in a supply chain using a plurality of sensor-data-loggers, wherein each sensor-data-logger comprises a memory device comprising a floating-gate with a sensing interface, the sensing interface having an energy barrier configured to leak electrons at a predetermined electron leakage rate through Fowler-Nordheim (F-N) tunneling, wherein an input to the sensing interface will alter a geometry of the energy barrier to change the electron leakage rate, and a current state of the sensor-data logger is determined by an initial state of the sensor-data-logger, the predetermined electron leakage rate, and any inputs to the sensing interface, the method comprising:

synchronizing the plurality of sensor-data-loggers so that each sensor-data-logger has the same initial state;

providing at least one of the plurality of the sensor-data-loggers in a first environment;

providing at least one of the plurality of the sensor-data-loggers in a second environment different from the first environment; and observing desynchronization of the sensor-data-loggers in the first environment and the second environment, indicating that the sensor-data-loggers were subjected to different environmental conditions, wherein the desynchronization is usable as a signature for performing at least one of authentication or identification.

9. The method of claim 8, wherein the sensing interface of each sensor-data-logger is configured to receive an ambient temperature as the input to the sensing interface.

10. The method of claim 8, wherein at least one sensor-data-logger of the plurality of sensor-data-loggers further comprises a sensor with its output coupled to the sensing interface.

11. The method of claim 10, wherein the sensor comprises a temperature sensor, a vibration sensor, or a radio frequency signal sensor.

12. The method of claim 10, wherein at least one of the sensor-data-loggers comprises a sensor different than at least one other sensor-data-logger of the plurality of sensor-data-loggers.

13. The method of claim 8, wherein each sensor-data-logger of the plurality of sensor-data-loggers further comprises a sensor with its output coupled to the sensing interface.

14. A supply chain monitoring system comprising:

a plurality of pairs of sensor-data-loggers, each sensor-data-logger comprising:

a memory device comprising a floating-gate with a sensing interface, the sensing interface having an energy barrier configured to leak electrons at a predetermined electron leakage rate through Fowler-Nordheim (F-N) tunneling, wherein an input to the sensing interface will alter a geometry of the energy barrier to change the electron leakage rate, and a current state of the sensor-data logger is determined by an initial state of the sensor-data-logger, the predetermined electron leakage rate, and any inputs to the sensing interface, and wherein a desynchronization of the plurality of pairs of sensor-data-loggers occurs when the plurality of pairs of sensor-data-loggers are subject to different environmental conditions, and the desynchronization is usable as a signature for performing at least one of authentication or identification.

15. The supply chain monitoring system of claim 14, wherein at least one of the plurality of pairs of sensor-data-loggers is provided in a first environment and at least one of the pairs of sensor-data-loggers is provided in a second environment different from the first environment.

16. The supply chain monitoring system of claim 15, wherein the plurality of sensor-data-loggers are synchronized with each sensor-data-logger having a same initial state.

17. The supply chain monitoring system of claim 14, wherein the sensing interface of each sensor-data-logger is configured to receive an ambient temperature as the input to the sensing interface.

18. The supply chain monitoring system of claim 14, wherein at least one sensor-data-logger of the plurality of sensor-data-loggers further comprises a sensor with its output coupled to the sensing interface.

19. The supply chain monitoring system of claim 18, wherein the sensor comprises a temperature sensor, a vibration sensor, or a radio frequency signal sensor.

20. The supply chain monitoring system of claim 18, wherein at least one of the sensor-data-loggers comprises a sensor different than at least one other sensor-data-logger of the plurality of sensor-data-loggers.

* * * * *